United States Patent [19]

Koide

[11] Patent Number: 5,251,055
[45] Date of Patent: Oct. 5, 1993

[54] OPTICAL SCANNING APPARATUS

[75] Inventor: Jun Koide, Yokohama, Japan

[73] Assignee: Canon Kabushiki Kaisha, Tokyo, Japan

[21] Appl. No.: 497,315

[22] Filed: Mar. 22, 1990

[30] Foreign Application Priority Data

Mar. 23, 1989 [JP] Japan .................................. 1-071530
Jul. 20, 1989 [JP] Japan .................................. 1-188474

[51] Int. Cl.⁵ .................................. G02B 26/08
[52] U.S. Cl. .................................. 359/216; 359/204; 359/206; 359/207; 359/662; 346/108; 250/578.1
[58] Field of Search .................................. 350/6.8, 6.2–6.7, 350/3.7, 3.71, 432–434; 346/157, 160, 108; 359/204, 206, 220–221, 216–219, 207, 662; 250/234, 578.1, 235, 236

[56] References Cited

U.S. PATENT DOCUMENTS

| | | | |
|---|---|---|---|
| 4,378,480 | 3/1983 | Langhans | 219/121 LK |
| 4,561,717 | 12/1985 | Kataoka | 350/6.8 |
| 4,578,688 | 3/1986 | Okuno | 346/157 |
| 4,796,961 | 1/1989 | Yamada et al. | 350/6.8 |
| 4,907,017 | 3/1990 | Azuma | 346/160 |
| 4,962,983 | 10/1990 | Watanabe | 359/217 |

FOREIGN PATENT DOCUMENTS

| | | |
|---|---|---|
| 0217325 | 4/1987 | European Pat. Off. . |
| 58-79215 | 5/1983 | Japan . |
| 61-92917 | 6/1986 | Japan . |
| 1360828 | 7/1974 | United Kingdom . |
| 1546246 | 5/1979 | United Kingdom . |

OTHER PUBLICATIONS

Tam et al., "Lasers in Electrophotography" IBM J. Res. Develop. 26:2:Mar. 1982.

Primary Examiner—Bruce Y. Arnold
Assistant Examiner—James Phan
Attorney, Agent, or Firm—Fitzpatrick, Cella, Harper & Scinto

[57] ABSTRACT

An optical scanning apparatus for effecting the scanning with plural light beams, without aberrations among the obtained scanning lines and without curvature in the scanning lines. For this purpose plural light beams emitted from plural light sources are deflected by a single deflector, composed for example of a rotary polygon mirror, and guided to respective scanned planes through a scanning condenser lens system, having the f-θ characteristics in the scanning direction and also having plural optical axes in the sub scanning direction.

28 Claims, 13 Drawing Sheets

SECTIONAL VIEW TAKEN ON LINE B-B
FIG. 2B(1)

SECTIONAL VIEW TAKEN ON LINE A-A
FIG. 2B(2)

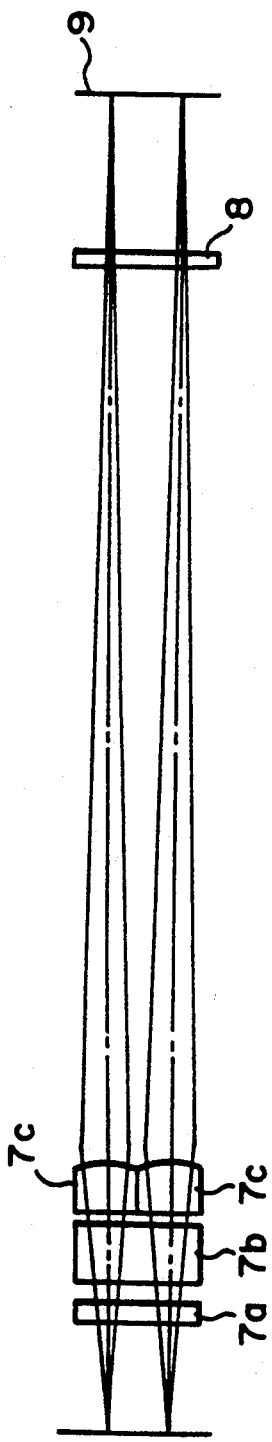
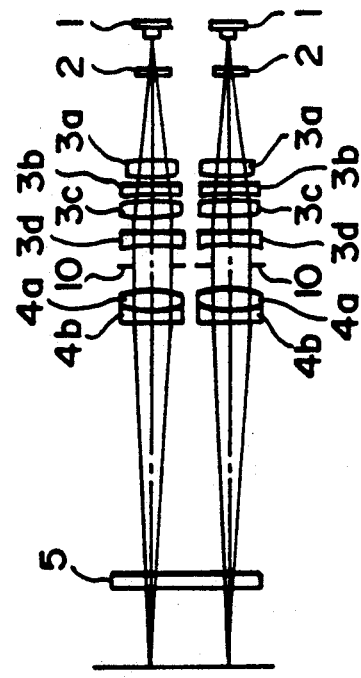
SECTIONAL VIEW TAKEN ON LINE E-E
FIG.6B(1)
SECTIONAL VIEW TAKEN ON LINE F-F
FIG.6B(2)

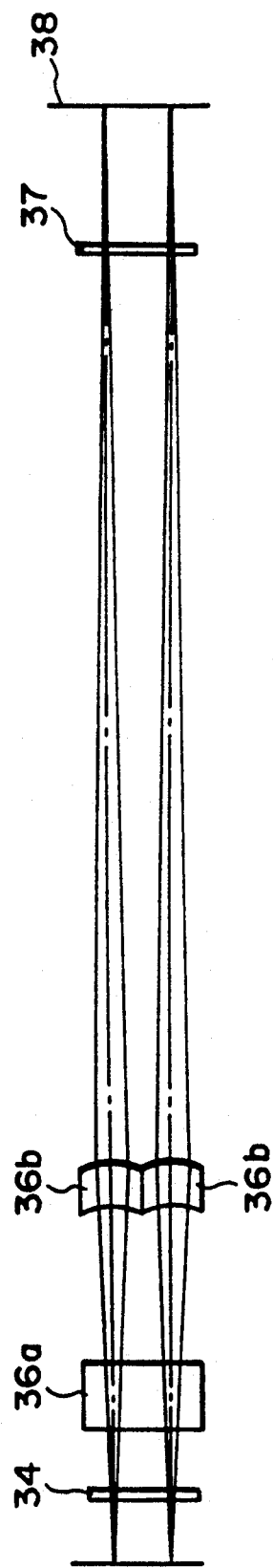
SECTIONAL VIEW TAKEN ON LINE G-G
FIG.7B(1)
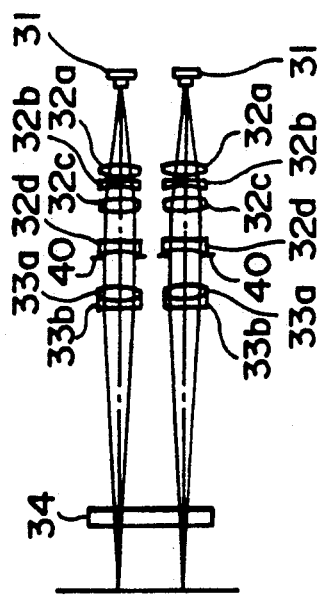
SECTIONAL VIEW TAKEN ON LINE H-H
FIG.7B(2)

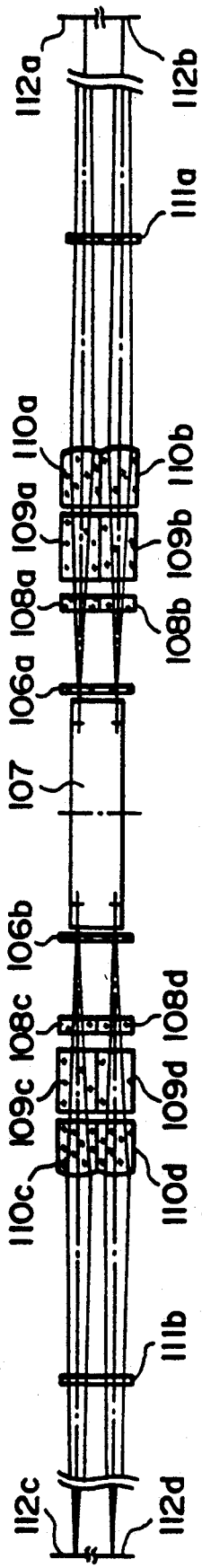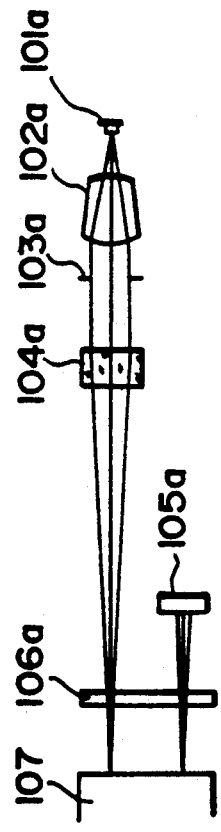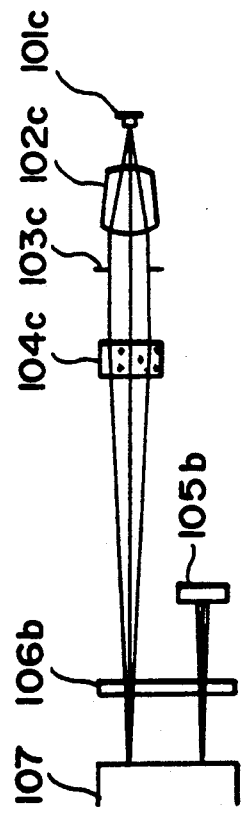
FIG.8B(1) SECTIONAL VIEW TAKEN ON LINE K-K
FIG.8B(2) SECTIONAL VIEW TAKEN ON LINE I-I
FIG.8B(3) SECTIONAL VIEW TAKEN ON LINE J-J

OPTICAL SCANNING APPARATUS

BACKGROUND OF THE INVENTION

1. Field of the Invention

The present invention relates to an optical scanning apparatus, and more particularly to an optical scanning apparatus for scanning planes constituting image bearing members with plural laser beams, adapted for use in an image recording apparatus such as a color laser beam, a multi-color laser beam printer and the like printer utilizing an electrophotographic process.

2. Related Background Art

In the optical scanning apparatus for example of a color laser beam printer (color LBP), there has already been employed image recording by scanning photosensitive image bearing members with plural laser beams.

In such conventional apparatus, plural laser beams are respectively introduced to different reflective deflecting planes of a rotary polygon mirror constituting a light deflector, and an f-$\theta$ lens is provided for each of the laser beams reflected by said reflective deflecting planes. The optical scanning of the image bearing plane is achieved by the laser beam from the f-$\theta$ lens, utilizing an anamorphic plane corrected for the inclination of the reflective deflecting plane. However such conventional apparatus tends to become bulky and complex in structure, since a set of scanning optical system is provided for each of the laser beam.

On the other hand, Japanese Laid-Open Utility Model No. 61-92917 and Japanese Laid-Open Patent and No. 58-79215 propose a method of mixing two laser beams into one by utilizing two beams of different polarization characteristics or different wavelengths, focusing such united laser beam at a point close to the scanned plane utilizing the lens systems of a number equal to a half of the number of original laser beams, then separating each laser beam into two by a polarizing beam splitter or a dichroic mirror and scanning respective image bearing planes with thus separated laser beams.

However, in the above-mentioned method, because of the mixing and separation of two laser beams the entire apparatus inevitably becomes complex, and certain light leak is unavoidable depending on the incident angle characteristics of the polarizing beam splitter and the dichroic mirror at such mixing or separation if the optical scanning angle on the scanned plane becomes large. For this reason it has not been possible to increase the scanning angle of the light too much.

Also the U.S. Pat. No. 4,561,717 discloses a method, as shown in FIG. 1, of introducing plural laser beams into a single reflective deflecting plane 520a of a light deflector 520 composed of a rotary polygon mirror, obliquely with different angles to the perpendicular direction to the scanning direction of scanned planes 561, 562. The beams are condensed by an f-$\theta$ lens 530 composed of spherical faces, then separated into plural beams by an optical device such as mirrors 541, 542 distanced from the laser beams, and guided to image bearing members 561, 562 for effecting the optical scanning thereon.

In such case, the laser beam obliquely entering the f-$\theta$ lens 530 composed of spherical faces causes curvature of scanning line due to the optical characteristics of the f-$\theta$ lens. Conventionally such curvature has been corrected by cylindrical lenses 551, 552 positioned in front of the image bearing planes.

In such method, however, since the light beam enters the cylindrical lens with a scanning angle (image angle in the scanning direction), the apparent refractive power of the cylindrical lens increases with the increase in the scanning angle. Thus the laser beam is focused in front of the scanned plane, so that the curvature of image plane becomes stronger, and the diameter of the laser beam becomes different between the central area and peripheral area of the scanned frame.

Also, if three or more laser beams are employed in the apparatus, the f-$\theta$ lens of spherical faces receives at least two oblique incident angles. If the angles are mutually different, the obtained scanning lines becomes different depending on the characteristics of the f-$\theta$ lens.

More specifically, since a skewed ray is introduced to the f-$\theta$ lens 530 composed of spherical faces, the f-$\theta$ characteristics are distorted depending on the oblique incident angle.

The f-$\theta$ characteristics in the scanning direction do not vary linearly for the oblique incident light. For an incident angle $\phi_0$, the coordinate $X(\phi=\phi_0)(\theta)$ in the scanning direction of the scanning beam is correlated with the scanning angle $\theta$ of the light deflector by:

$$X(\phi = \phi_0)(\theta) = \frac{\tan\theta}{\sqrt{(\tan\theta)^2 + (\tan\phi_0)^2}} f \cdot \alpha$$

wherein f is the focal length of the f-$\theta$ lens, and $\alpha$ is the incident angle of the skewed light beam.

Consequently the scanning lines are inevitably different for different incident angles to the f-$\theta$ lens. This phenomenon leads to mutual aberration of scanning lines of different colors for example in a color laser beam printer requiring precise registration of multiple colors. As an example, if a same second condenser lens (anamorphic lens) is employed for correction the curvature of two scanning lines respectively of oblique incident angles of 2.5° and 7.5°, an f-$\theta$ lens of spherical faces with a focal length of 313.55 mm gives rise to a difference of 0.6 mm in the length of the scanning lines at a scanning angle of 30° (a scanning position of 160 mm). Then, if the image magnification in the scanning direction is modified to match the scanning position at the scanning angle of 30°, there will result an aberration of about 60 $\mu$m between the scanning lines at a scanning angle of about 16°.

Even if the scanning lines are positionally balanced, an aberration of ±30–40 $\mu$m is unavoidable, corresponding to an aberration of a half of the pixel for example in a printer with a resolving power of 400 DPI.

SUMMARY OF THE INVENTION

In consideration of the foregoing, the object of the present invention is to provide an optical scanning apparatus capable of providing uniform f-$\theta$ characteristics for plural scanning lines formed by plural scanning light beams, achieving optical scanning with little mutual aberration in the superposition of the scanning lines while maintaining satisfactory optical characteristics with little curvature in the scanning lines, and realizing a compact and simple structure.

The foregoing object can be attained, according to the present invention, by an optical scanning apparatus in which plural light beams deflected by a single deflector are focused on scanned planes through a scanning condenser lens system which has f-$\theta$ characteristics in the scanning direction and has plural optical axes in the sub scanning direction.

More specifically, the scanning condenser lens system is composed of two lens groups, of which first lens group is composed of a cylindrical lens having a refractive power only in the scanning direction or a lens afocal in the sub scanning direction, and the second lens group having optical axes respectively for plural light beams is composed of an anamorphic lens group having difference refractive powers in the scanning direction and in the sub scanning direction. Consequently the scanning condenser lens system can have plural optical axes, and a symmetrical plane to each of the plural optical axes is selected as the scanned plane, whereby the f-$\theta$ characteristics are unified for all the scanning light beams and the curvature of the scanning line can be basically eliminated.

Besides, in comparison with the conventional structure having a scanning condenser lens for each of the plural light beams, the structure is simpler and the light deflector and the scanning condenser lens system can be accommodated in a smaller space

BRIEF DESCRIPTION OF THE DRAWINGS

FIGS. 2A and 2B(1)-2B(2) are schematic view of an embodiment of the optical scanning apparatus of the present invention;

FIGS. 6A, 6B(1)-6B(2), 7A, 7B(1)-7B(2), 8A, 8B(1)-8B(2), 9 and 10 are schematic views of still other embodiments of the optical scanning apparatus of the present invention.

DESCRIPTION OF THE PREFERRED EMBODIMENTS

Figure 1:
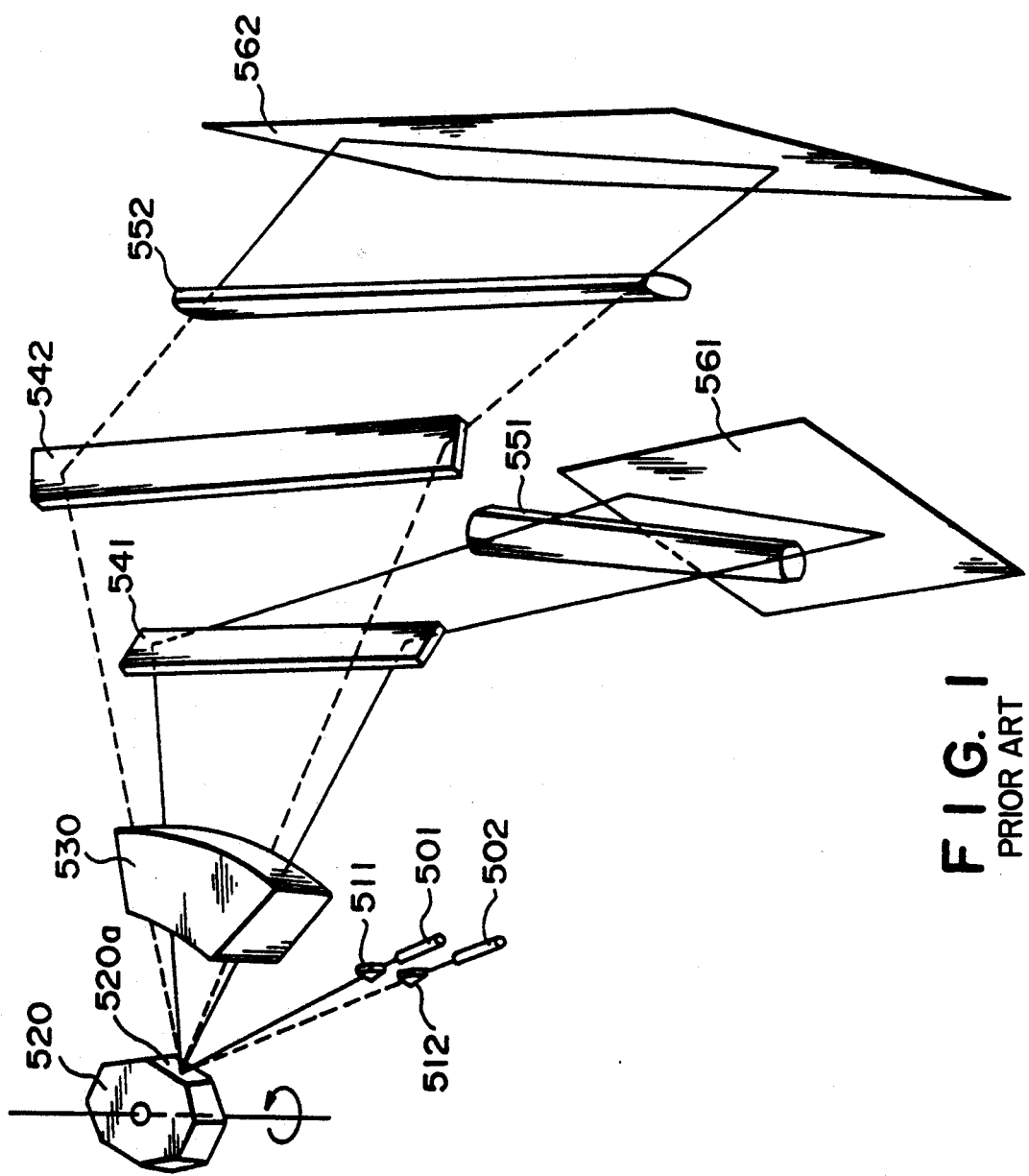
FIG. 1 is a schematic view of a principal part of a conventional optical scanning apparatus.
Figure 2A:
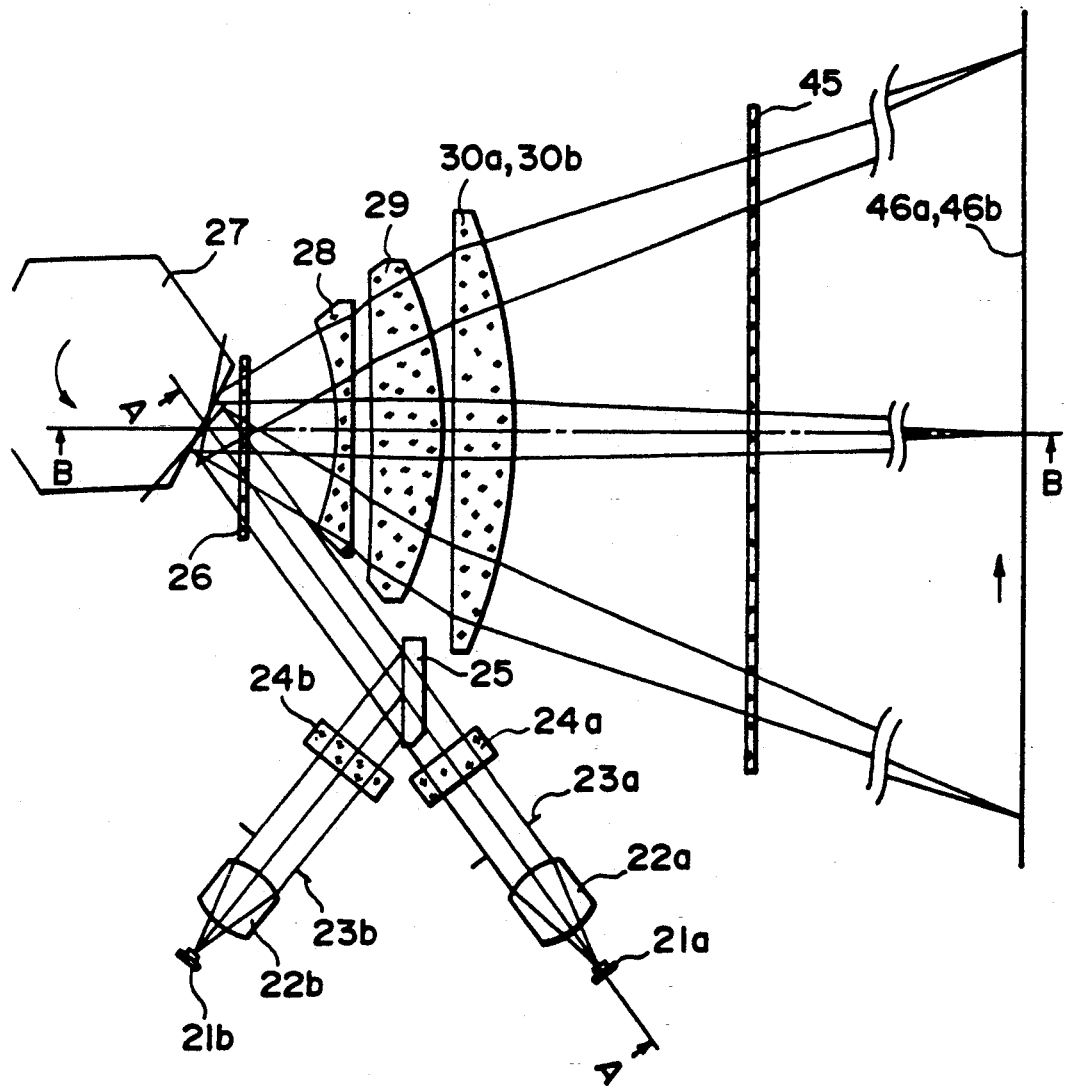

FIGS. 2A and 2B are schematic view of an embodiment of the optical scanning apparatus of the present invention, respectively showing the structure in a scanning plane and that in a sub scanning plane containing the optical axis of the lens and perpendicular to the scanning plane.

Figure 3:
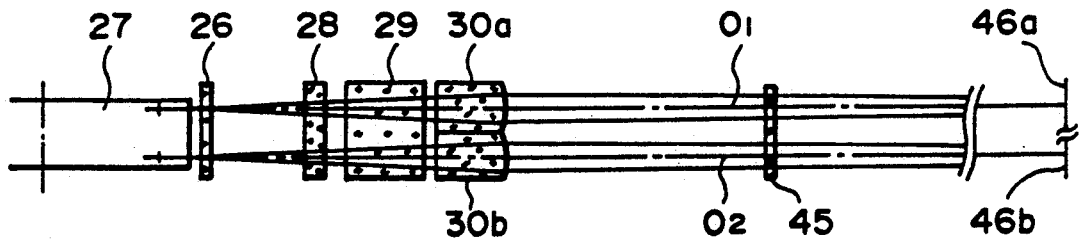
FIG. 3 is a perspective view of a principal part of the embodiment shown in FIG. 2.
Figure 3:
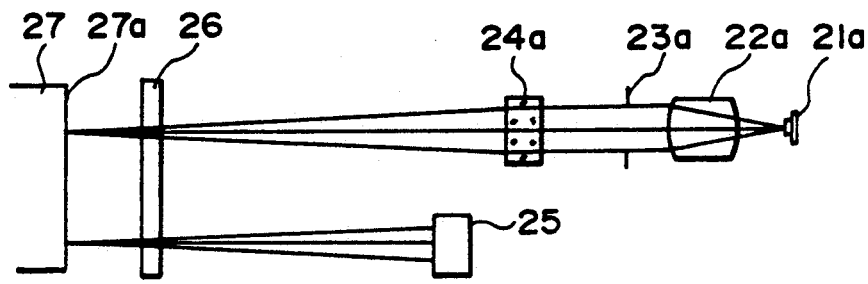
Figure 3:
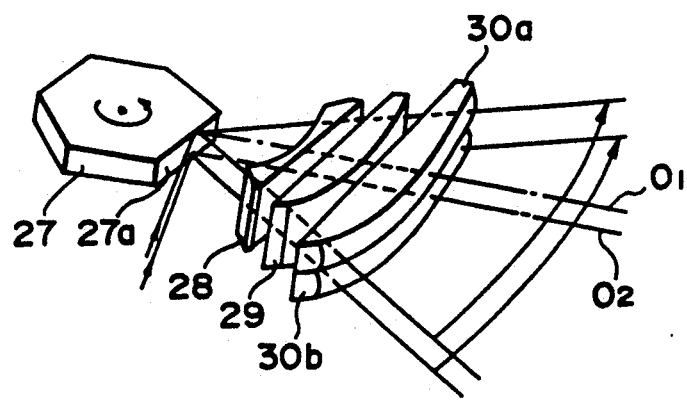

Also FIG. 3 is a perspective view of a deflector and a scanning condenser lens system.

In the following description, the scanning direction means a direction, on the scanned plane, of scanning of the light beam deflected by the deflector, and the scanning plane means a plane formed by the movement of the light beam deflected by the deflector.

In the present embodiment, two laser beams are employed for scanning respective scanned planes with different optical information. Thus the two laser beams are modulated according to respectively different information signals. Light beams emitted from two semiconductor laser units 21a, 21b are converted into parallel beams respectively by collimating lenses 22a, 22b, then transmitted by diaphragms 23a, 23b and enter cylindrical lenses 24a, 24b, which have refractive powers in the sub scanning direction (perpendicular to the scanning plane formed by the movement of the laser beams), and converges the laser beams in the sub scanning direction. The beam from the cylindrical lens 24b is reflected by a mirror 25, then transmitted by a cover glass 26 and introduced to a rotary polygon mirror 27 serving as a light deflector, while that from the cylindrical lens 24a is transmitted by the cover glass 26 and introduced to the rotary polygon mirror 27.

The rotary polygon mirror 27 is rotated at a constant speed in a direction indicated by an arrow, and guides the incident light beams to a scanning condenser lens system 28, 29, 30a, 30b by reflection on a reflective deflecting plane 27a. The lens system has f-$\theta$ characteristics in the scanning direction and two optical axes $O_1$, $O_2$ in the sub scanning direction, and has conjugate points on the reflective deflecting plane 27a of the rotary polygon mirror 27 and on scanned planes 46a, 46b for correcting the inclination of the deflecting plane 27a. Lenses 28, 29 are composed of cylindrical lenses having refractive power only in the scanning direction. Two laser beams with mutually parallel optical axes enter the lenses 28, 29 substantially perpendicularly thereto, and then enter respectively lenses 30a, 30b in the parallel state. The lenses 30a, 30b are composed of anamorphic lenses having different refractive powers in the scanning direction and in the sub scanning direction, whereby the laser beams scan the planes 46a, 46b in a direction indicated by an arrow, through a cover glass 45.

The above-explained optical system can be used for independently modulating plural laser beams and effecting simultaneous optical recordings on different positions of a recording material. As an example, it can be employed in a multi-color laser beam printer.

In this case two laser beams scan different positions on a recording material called photosensitive drum. The optically recorded information on the photosensitive drum is printed on a plain paper by a well known electrophotographic process.

As explained above, the optical scanning apparatus of the present invention, for deflecting plural light beams from light sources by a single deflector and guiding the light beams through a scanning condenser lens system for scanning respective planes, is featured by a fact that the scanning condenser lens system is composed of a first lens group having f-$\theta$ characteristics in the scanning direction and adapted to refract the light beams by a same single lens, and a second lens group arranged in the sub scanning direction (perpendicular to the scanning direction) and having refractive power on respective light beams. The first lens group is composed of an array, along the optical axis, of cylindrical lenses having refractive power only in the scanning plane or lenses afocal in the sub scanning direction, and the scanning condenser lens system is provided with plural optical axes parallel to the scanning plane. Also the second lens group is composed of an array, along the sub scanning direction, of anamorphic lenses having different refractive powers in the scanning direction and in the sub scanning direction.

Also the scanning lens system has conjugate points, in the sub scanning direction, on the reflective deflecting plane of the deflector and on the scanned planes. The lens system is composed of a first lens group and a second lens group, wherein the first lens group has an afocal refractive force in the sub scanning direction, and the second lens group has optical axes respectively corresponding to plural beams. Also the second lens group is an anamorphic lens system having different refractive powers in the scanning direction and in the sub scanning direction. Also the second lens group is composed of a lens system having a toric face. The plural light beams deflected by the deflector enter the scanning lens system in a state with mutually parallel central rays and along a plane perpendicular to the scanning plane.

Figure 4:
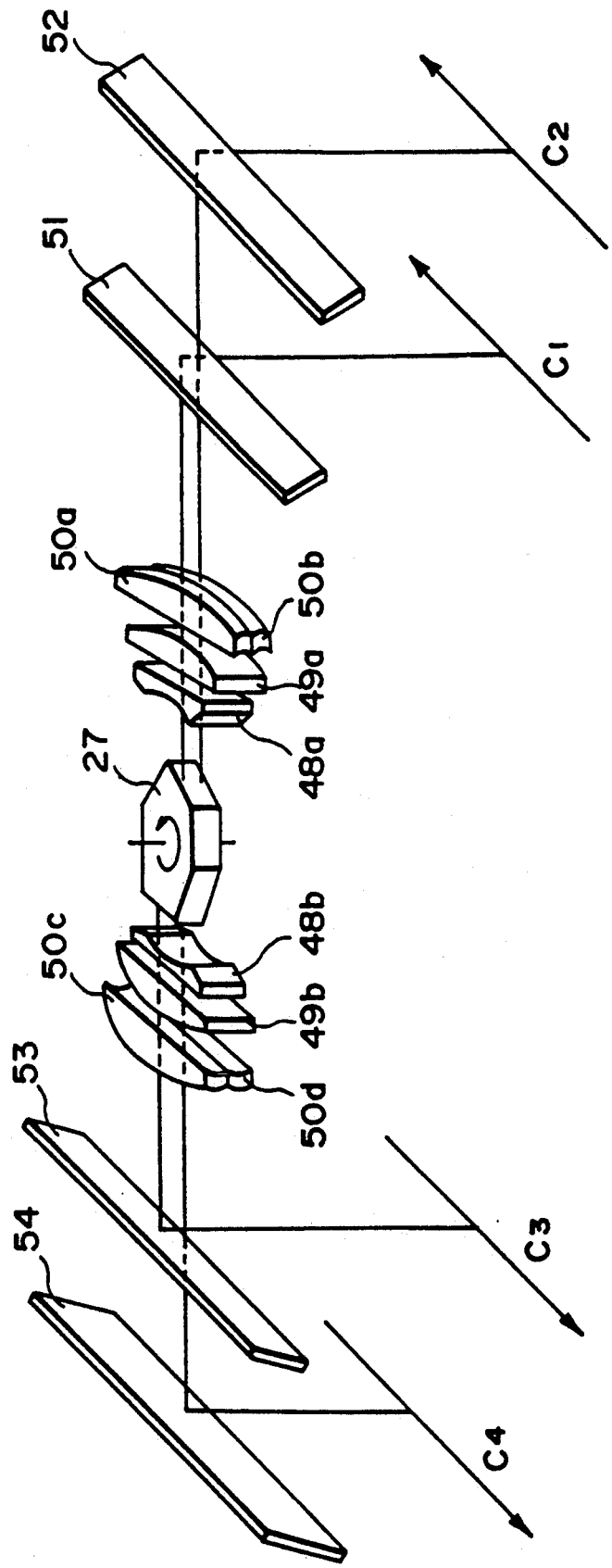
FIGS. 4 and 5 are schematic view of another embodiment of the present invention.

FIG. 4 is a perspective view of a second embodiment of the optical scanning apparatus of the present invention, wherein the light sources, collimating lenses, cylindrical lenses and scanned planes are omitted for the purpose of simplicity.

Referring to FIG. 4, two sets of scanning condenser lens systems 48a, 49a, 50a, 50b; 48b, 49b, 50c, 50d are symmetrically positioned with respect to a rotary polygon mirror 27, thereby putting four laser beams into scanning motion. The light beams are reflected by mirrors 51, 52, 53, 54 to respectively effect the scanning at C1, C2, C3, C4. The present second embodiment is basically composed of two sets of the structures of the first embodiment, positioned symmetrically about the rotary polygon mirror 27, and the function and effect are basically same as those in the first embodiment. The second embodiment can record a full-color image by generating Y (yellow), M (magenta), C (cyan) and Bk (black) images respectively on the scanning lines C1-C4 and superposing the images.

Figure 5:
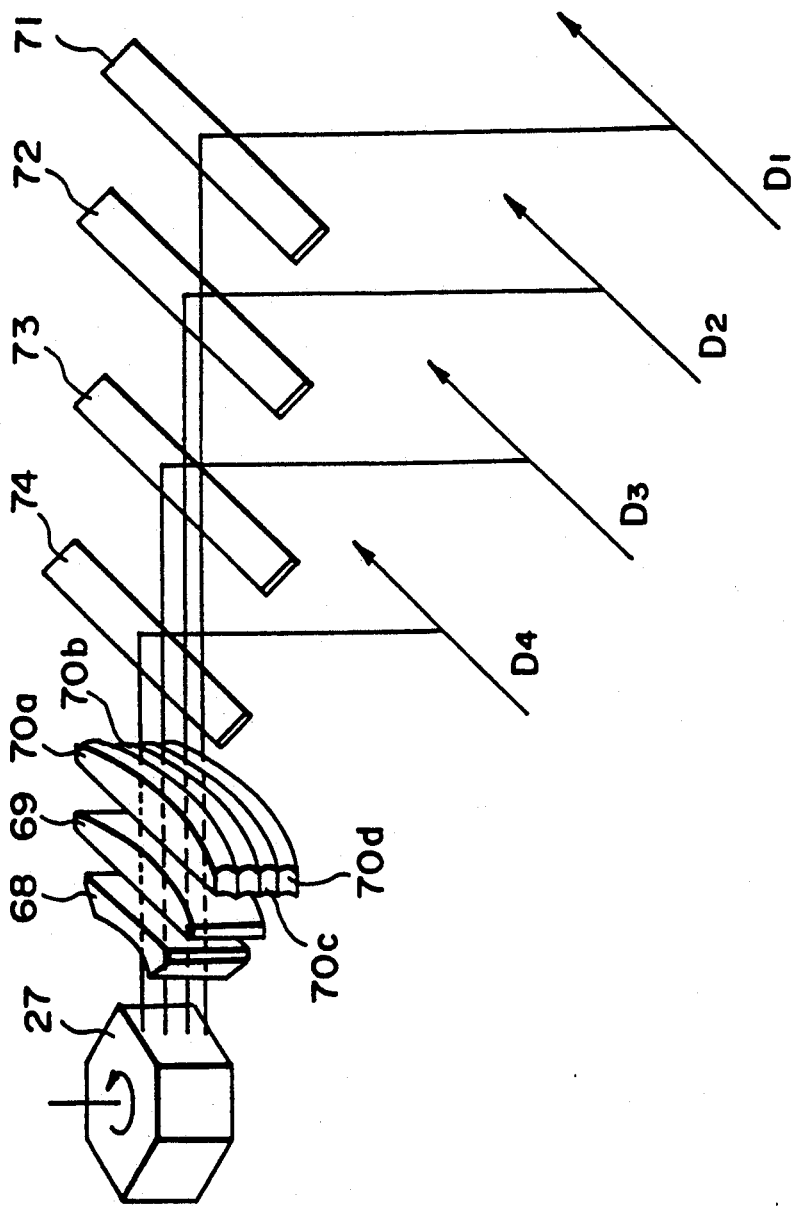

FIG. 5 is a perspective view of a third embodiment of the optical scanning apparatus of the present invention, wherein the light sources, collimating lenses, cylindrical lenses, scanned planes etc. are omitted for the purpose of simplicity. In contrast to the first embodiment handling two laser beams, the present third embodiment puts four laser beams into scanning motion by a set of scanning condenser lens system 68, 69, 70a, 70b, 70c, 70d to effect the scanning at D1, D2, D3, D4 respectively through mirrors 71, 72, 73, 74. The function and the effect are basically same as in the first embodiment. A full-color image can be recorded with four laser beams as in the second embodiment.

In the optical scanning apparatus of the present invention of the above-explained structure, there is employed only one deflector, and the scanning condenser lens system of f-$\theta$ characteristics is composed of a lens group for refracting plural light beams with a single lens and another lens group having respective refractive powers for the light beams, whereby the condenser lens system is provided with plural parallel optical axes arranged in the sub scanning direction. There is thus obtained an optical scanning apparatus capable of achieving simultaneous scanning operations with plural light beams by a relatively simple structure, with unified f-$\theta$ characteristics in different scanning lines and without curvature in the scanning lines.

Figure 6A:
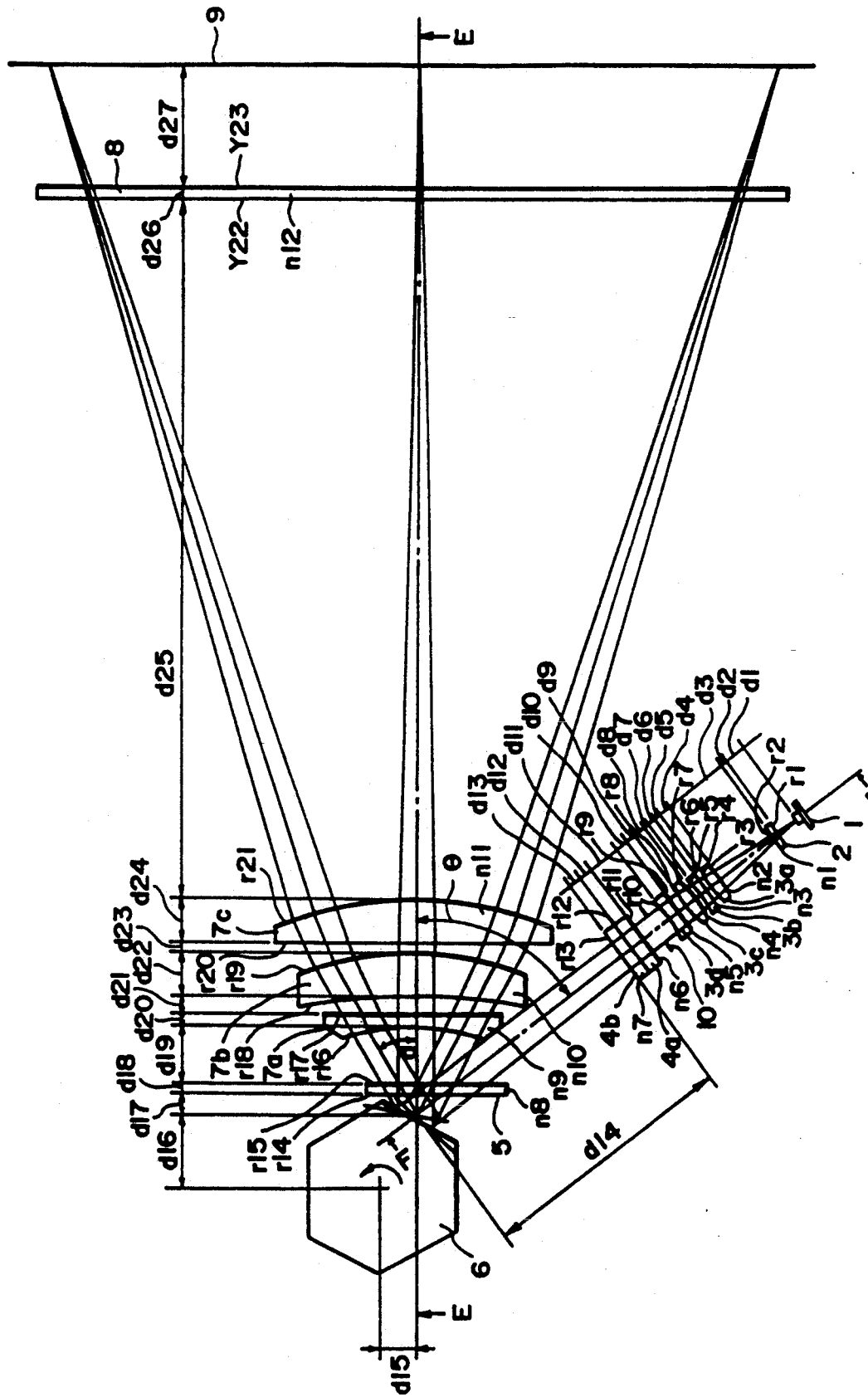

FIGS. 6A and 6B are optical path charts of another embodiment of the optical scanning apparatus of the present invention. FIG. 6A shows the structure in the scanning plane formed by the movement of the light beam in scanning motion. The scanning plane is taken parallel to the plane of drawing. FIG. 6B shows the structure in the sub scanning direction, which is perpendicular to the scanning plane.

Light beams emitted from two semiconductor laser diodes 1 modulated according to image signals are converted into parallel light beams by collimating lenses 3a, 3b, 3c, 3d, and the diameters of the beams are determined by diaphragm members 10. The light beams are converged in the sub scanning direction only by cylindrical lenses 4a, 4b, then enter a reflective deflective plane of a rotary polygon mirror 6 constituting the deflector, and focused on a scanned plane 9 by scanning lenses 7a, 7b, 7c having f-$\theta$ characteristics in the scanning direction and functioning as a conjugate imaging system in the sub scanning direction. The focused beam linearly scans the plane 9 by the rotation of the rotary polygon mirror 6 at a constant speed in a direction indicated by an arrow in FIG. 6A.

In FIGS. 6A and 6B, cover glasses 2, 5, 8 are provided for dust prevention. In the sub scanning direction, the scanning lenses 7a-7c has conjugate points on the reflective deflecting plane and the scanned plane 9, constituting a structure for so-called inclination correction, by which a same scanning line is always followed on the plane 9 even if the axis of the polygon mirror 6 shows a procession movement in the rotation or if the reflective plane of the polygon mirror 6 is inclined due to insufficient precision of mechanical working.

Optical parameters of the above-explained embodiment shown in FIGS. 6A and 6B are listed in Table 1, in which symbols are same as used in FIGS. 6A and 6B.

TABLE 1

Embodiment shown in FIGS. 6A and 6B.
Diameter of diaphragm 10: 13.2 mm in the scanning direction and 10.5 mm in the sub scanning direction.
Wavelength of used laser beam: 675 ± 5 nm, $\theta = 53°$.

| | (mm) |
|---|---|
| d1 | 2 |
| d2 | 1 |
| d3 | 48.512 |
| d4 | 2.73 |
| d5 | 4.19 |
| d6 | 1.52 |
| d7 | 0.61 |
| d8 | 3.14 |
| d9 | 27.71 (adjusted) |
| d10 | 4 |
| d11 | 25 (adjusted) |
| d12 | 6 |
| d13 | 4 |
| d14 | 107.7 (adjusted) |
| d15 | 14.59 |
| d16 | 29.28 |
| d17 | 10 |
| d18 | 2 |
| d19 | 24.11 |
| d20 | 4.83 |
| d21 | 4.72 |
| d22 | 20.06 |
| d23 | 2.28 |
| d24 | 18.13 |
| d25 | 286.81 |
| d26 | 2 |
| d27 | 50 |

| | scanning direction (mm) | sub scanning direction (mm) |
|---|---|---|
| r1 | ∞ | ∞ |
| r2 | ∞ | ∞ |
| r3 | 166.67 | 166.67 |
| r4 | −44.438 | −44.438 |
| r5 | ∞ | ∞ |
| r6 | 35.753 | 35.753 |
| r7 | 39.996 | 39.996 |
| r8 | −49.716 | −49.716 |
| r9 | ∞ | ∞ |
| r10 | 151.41 | 151.41 |
| r11 | ∞ | 38.912 |
| r12 | ∞ | −42.648 |
| r13 | ∞ | ∞ |
| r14 | ∞ | ∞ |
| r15 | ∞ | ∞ |
| r16 | −80.298 | ∞ |
| r17 | ∞ | ∞ |
| r18 | −1136.15 | ∞ |
| r19 | −102.9 | ∞ |
| r20 | ∞ | −90.473 |
| r21 | −148.41 | −28.685 |
| r22 | ∞ | ∞ |

TABLE 1-continued

Embodiment shown in FIGS. 6A and 6B.
Diameter of diaphragm 10: 13.2 mm in the scanning
direction and 10.5 mm in the sub scanning direction.
Wavelength of used laser beam: 675 ± 5 nm, θ = 53°.

| r23 | ∞ | ∞ |
|---|---|---|

| | nd |
|---|---|
| n1 | 1.51633 |
| n2 | 1.51633 |
| n3 | 1.72825 |
| n4 | 1.60311 |
| n5 | 1.51633 |
| n6 | 1.51633 |
| n7 | 1.72825 |
| n8 | 1.51633 |
| n9 | 1.62004 |
| n10 | 1.60311 |
| n11 | 1.62299 |
| n12 | 1.51633 |

Scanned length: ±150 mm with respect to the optical axis,
Rotary polygon mirror 6: hexagonal, with diameter of circumscribed circle ∅ = 73 mm,
Spot diameter of light beam focused through the scanning lenses (7a-7c): 30 μm in the scanning direction,
Focal length of the scanning lenses (7a-7c): f = 286.5 mm in the scanning direction,
Scanning angle, or maximum deflection angle from the optical axis of the scanning lenses by the deflector: α = 30°.

Figure 7A:
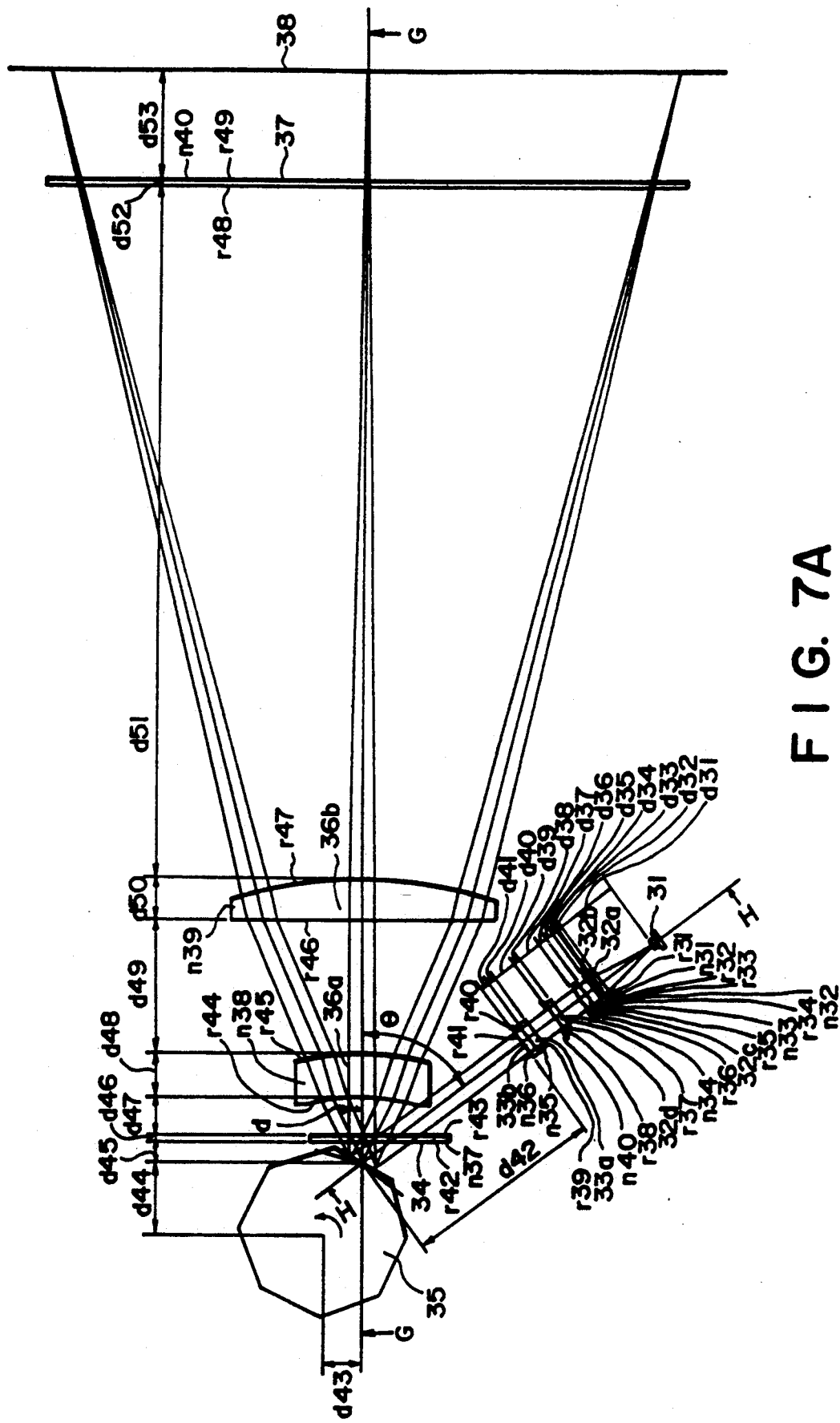

FIGS. 7A and 7B are optical path charts of another embodiment of the present invention, respectively showing the structure in the scanning plane formed by the movement of the light beam in scanning motion, taken parallel to the plane of drawing, and the structure in the sub scanning direction perpendicular to the scanning plane.

Referring to FIGS. 7A and 7B, light beams emitted from two semiconductor laser diodes 31 modulated according to image signals are converted into parallel beams by collimating lenses 32a, 32b, 32c, 32d, and the diameter of the beams is determined by a diaphragm member 40. The beams are converged in the sub scanning direction only by cylindrical lenses 33a, 33b, then deflected by a reflective deflecting plane of a rotary polygon mirror 35 constituting a deflector, and focused onto a scanned plane 38 through scanning lenses 36a, 36b and constituting conjugate imaging systems in the sub scanning direction. The focused beam linearly scans the plane 38 by the rotation of the rotary polygon mirror 35 at a constant speed in a direction shown in FIG. 7A.

In FIGS. 7A and 7B, cover glasses 34, 37 are provided for dust prevention. The scanning lenses 36a, 36b have conjugate points on the reflective deflecting plane of the polygon mirror and on the scanned plane 38, constituting a structure for so-called inclination correction, by which a same scanning line is always followed on the plane 38 even if the axis of the polygon mirror 35 shows a procession movement in the rotation or if the reflective plane of the polygon mirror 35 is inclined due to insufficient precision of mechanical working.

Optical parameters of the above-explained embodiment shown in FIGS. 7A and 7B are listed in Tab. 2, in which symbols are same as used in FIGS. 7A and 7B.

TABLE 2

Embodiment 2 (shown in FIGS. 7A and 7B).
Diameter of diaphragm 4: 11.0 mm in the scanning direction and 7.2 mm in the sub scanning direction,
Wavelength of used laser beam: 675 ± 5 nm, θ = 53°.

| | (mm) |
|---|---|
| d31 | 29.168 |
| d32 | 2.58 |
| d33 | 1.32 |
| d34 | 1.04 |
| d35 | 4.12 |
| d36 | 4.11 |
| d37 | 12.00 (adjusted) |
| d38 | 3.00 |
| d39 | 12.00 (adjusted) |
| d40 | 4.00 |
| d41 | 3.00 |
| d42 | 74.18 (adjusted) |
| d43 | 17.21 |
| d44 | 34.72 |
| d45 | 10.00 |
| d46 | 2.00 |
| d47 | 18.22 |
| d48 | 21.02 |
| d49 | 61.68 |
| d50 | 18.36 |
| d51 | 320.0 |
| d52 | 2.00 |
| d53 | 50.0 |

| | scanning direction (mm) | sub scanning direction (mm) |
|---|---|---|
| r31 | 83.906 | 83.906 |
| r32 | −21.826 | −21.826 |
| r33 | −41.862 | −41.862 |
| r34 | 15.253 | 15.253 |
| r35 | 30.467 | 30.467 |
| r36 | −16.997 | −16.997 |
| r37 | ∞ | ∞ |
| r38 | 101.8 | 101.8 |
| r39 | ∞ | 30.034 |
| r40 | ∞ | −30.034 |
| r41 | ∞ | ∞ |
| r42 | ∞ | ∞ |
| r43 | ∞ | ∞ |
| r44 | −101.41 | ∞ |
| r45 | −110.47 | ∞ |
| r46 | −147.43 | ∞ |
| r47 | −41.694 | −218.74 |
| r48 | ∞ | ∞ |
| r49 | ∞ | ∞ |

| | nd |
|---|---|
| n31 | 1.51633 |
| n32 | 1.72825 |
| n33 | 1.60311 |
| n34 | 1.51633 |
| n35 | 1.51633 |
| n36 | 1.74077 |
| n37 | 1.51633 |
| n38 | 1.62299 |
| n39 | 1.60311 |
| n40 | 1.51633 |

Scanned length: ±150 mm with respect to the optical axis;
Rotary polygon mirror 35: octagonal with a diameter of circumscribed circle ∅ = 82 mm;
Spot diameter in the scanning direction, focused by the scanning lenses (36a, 36b): 45 μm;
Focal length of the scanning lenses (36a, 36b) in the scanning direction: f = 343.5 mm;
Scanning angle, or maximum deflection angle by the deflector from the optical axis of the scanning lenses: α = 24.75°.

In the following there will be explained the structure of an optical scanning apparatus for plural beam scanning, enabling compacter spatial arrangement.

Figure 8A:
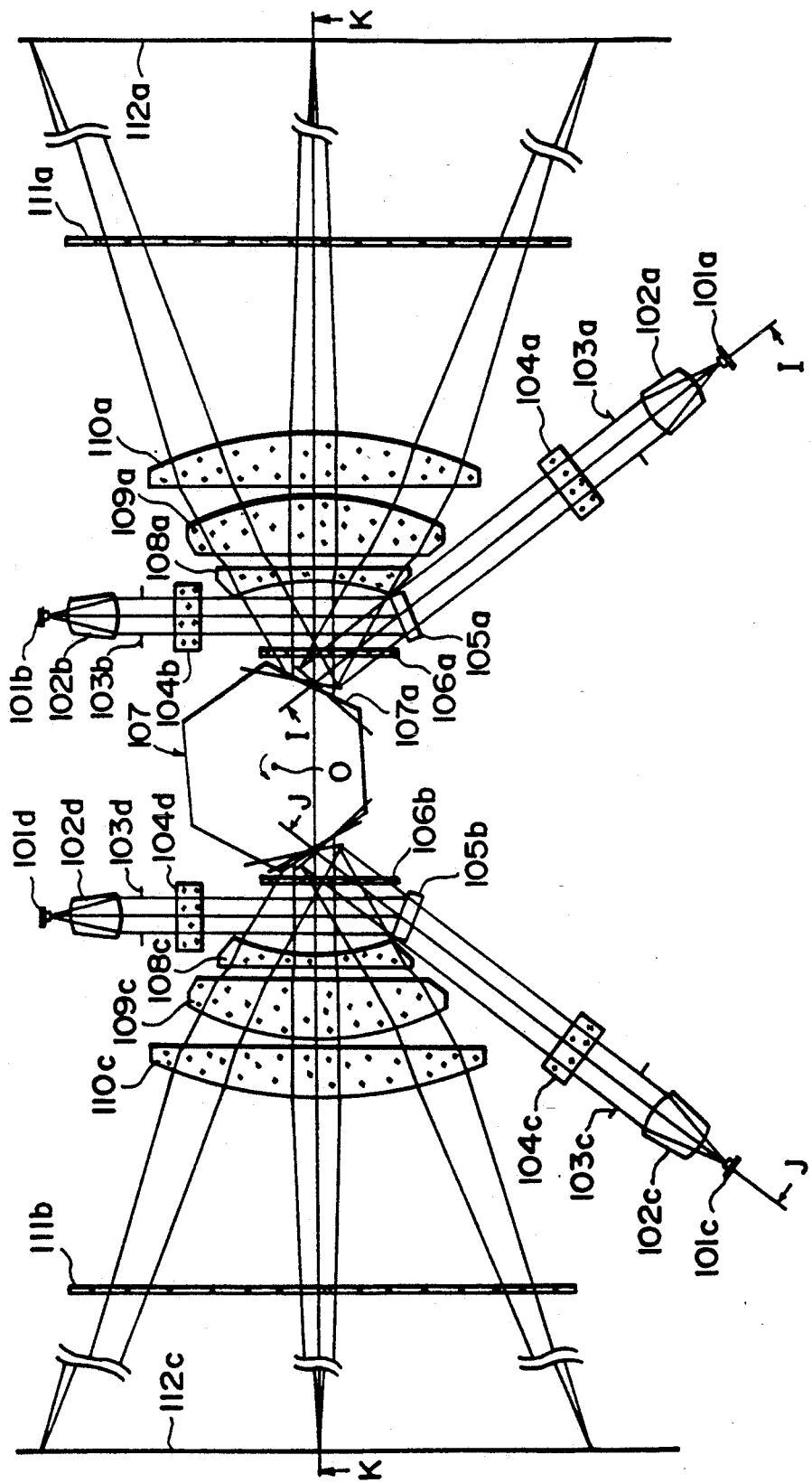

FIGS. 8A and 8B are optical path charts of another embodiment of the present invention, respectively showing the structure in the scanning plane and that in a cross section along the sub scanning direction perpendicular to the scanning plane.

The present embodiment is designed to scan different planes respectively with four laser beams bearing different optical information. There are shown semiconductor laser units 101a, 101b, 101c, 101d; collimating lenses 102a, 102b, 102c, 102d for converting laser beams, emitted from the semiconductor laser units, into parallel light beams; diaphragms 103a, 103b, 103c, 103d; and cylindrical lenses 104a, 104b, 104c, 104d having refractive powers in the sub scanning direction, for focusing the light beams, from the laser units 101a-101d, in the vicinity of a reflective deflecting plane of a light deflector composed of a rotary polygon mirror 107.

Mirrors 105a, 105b are provided for reflecting the light beams from the laser units 101b, 101d and guiding the beams to respectively reflective planes 107a of the rotary polygon mirror 107, with a predetermined pitch in the sub scanning direction (see K-K cross section in FIG. 8B(1), whereby cylindrical lenses 104a, 104b, 104c, 104d; collimating lenses 102a, 102b, 102c, 102d and laser units 101a, 101b, 101c, 101d can be positioned on both sides of the optical axis of scanning condenser lenses 108l, 109a, 110a, 108b, 109b, 110b; 108c, 109c, 110c, 108d, 109d, 110d.

As will be apparent from FIG. 8A, the laser beams from the laser units 101b, 101d, positioned in the upper part of FIG. 8A, opposite to the entry side of the laser beams to the polygon mirror 107 (lower part of FIG. 8A), pass through gaps between the rotary polygon mirror 107 and the scanning condenser lenses 108a-110a, 108b-110b; or 108c-110c, 108d-110d, before entering the reflective plane 107a of the polygon mirror 107.

In the above-explained structure, the scanning condenser lenses composed of spherical lenses 108a-108d, 109a-109d and anamorphic lenses 110a-110d have f-θ characteristics in the scanning direction, and constitute anamorphic lens systems in the sub scanning direction, having conjugate points on the reflective deflecting plane 107a and on the scanned planes 112a, 112b, 113c, 112d, whereby the beam scans always a same position on the planes 112a-112d even if the reflective plane 107a is inclined (correction for inclination), and the beam deflected by the polygon mirror 107 rotated at a constant speed is converted into a constant-speed linear movement of a spot on the scanned plane.

Cover glasses 106a, 106b, 111a, 111b are provided for dust prevention.

In the embodiment shown in FIGS. 8A and 8B, as explained in the foregoing, the laser units 101a-101d, condenser lenses 108a-110a, 108b-110b, 108c-110c, 108d-110d and scanned planes 112a-112d are positioned symmetrically with respect to a plane including the rotary axis 0 of the polygon mirror 107, whereby the space can be efficiently utilized in wall balanced manner.

Figure 9:
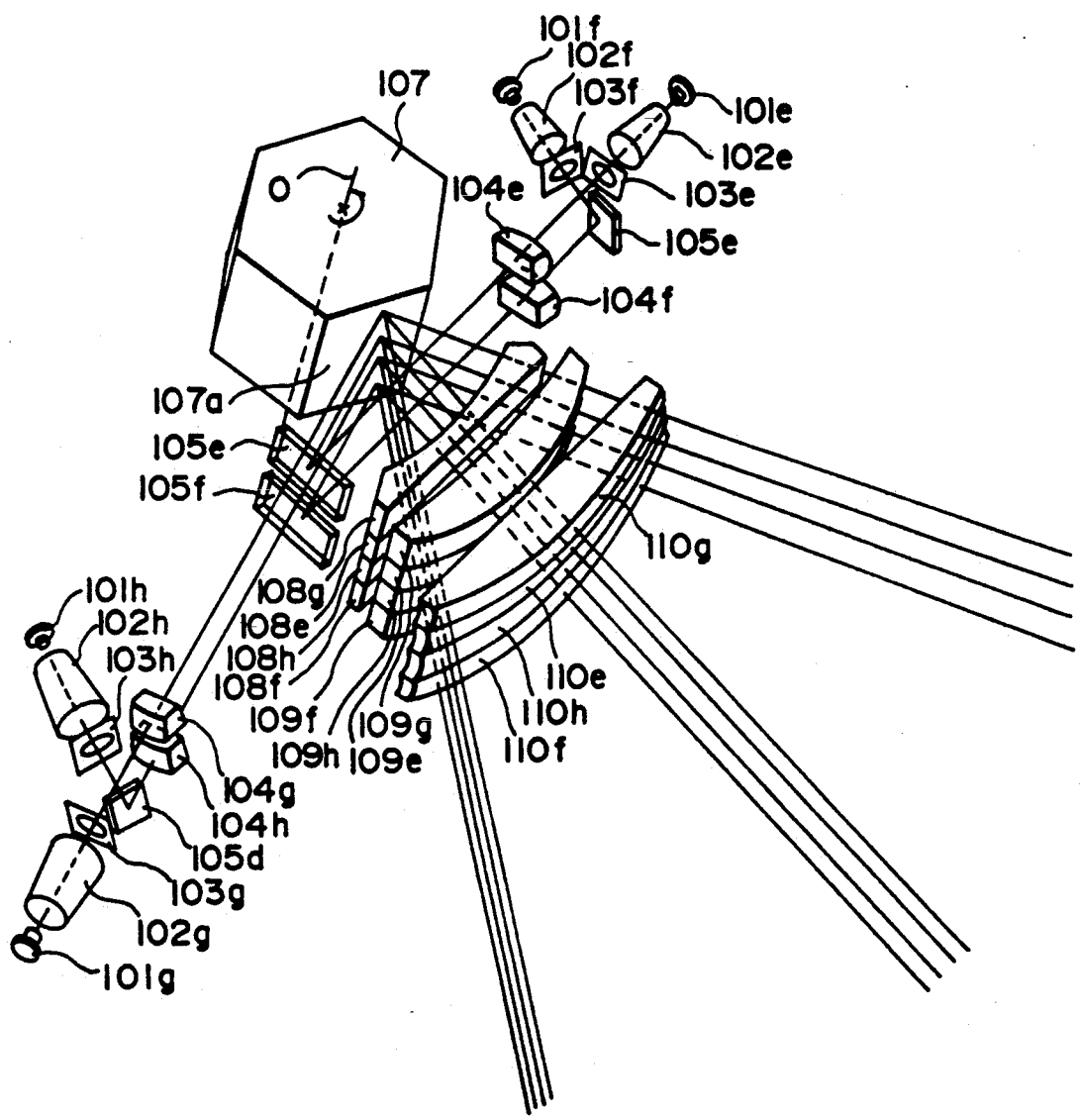

FIG. 9 is a schematic perspective view of another embodiment of the optical scanning apparatus of the present invention.

In the present embodiment shown in FIG. 9, on a side of a rotary polygon mirror 107, there are provided a plane 107a deflecting four laser beams; laser units 101e-101h; collimating lenses 102e-102h; diaphragms 103e-103h; cylindrical lenses 104e-104h; and scanning condenser lenses 108e-108h, 109e-109h, 110e-110h. The laser units 101e, 101f; 101g, 101h; collimating lenses 102e, 102f; 102g, 102h; diaphragms 103e, 103f; 103g, 103h; and cylindrical lenses 104e, 104f; 103g, 104h are divided, by two units, on each side of the optical axis of scanning condenser lenses 108e-108h, 109e-109h, 110e-110h. The light beams from two laser units 101e, 101f (beam from the laser unit 101f being reflected by a mirror 105c) are guided between the rotary polygon mirror 107 and condenser lenses 108e-108h, 109e-109h, 110e-110h, then respectively reflected by mirror 105e, 105f and introduced into the reflective plane 107a.

The laser beams from two laser units 101g, 101h (beam from the laser unit 101h being reflected by a mirror 105d) are directly introduced into the reflective plane 107a.

The present embodiment shown in FIG. 9 is advantageous in compactizing the apparatus when the scanning light beams have a long light path length. The four light beams can be utilized for forming four images respectively of yellow, magenta, cyan and black, or red, green, blue and black, in an image forming apparatus for forming a full-color image by multiple image transfers. Other functions are same as those in the embodiment shown in FIGS. 8A and 8B.

Figure 10:
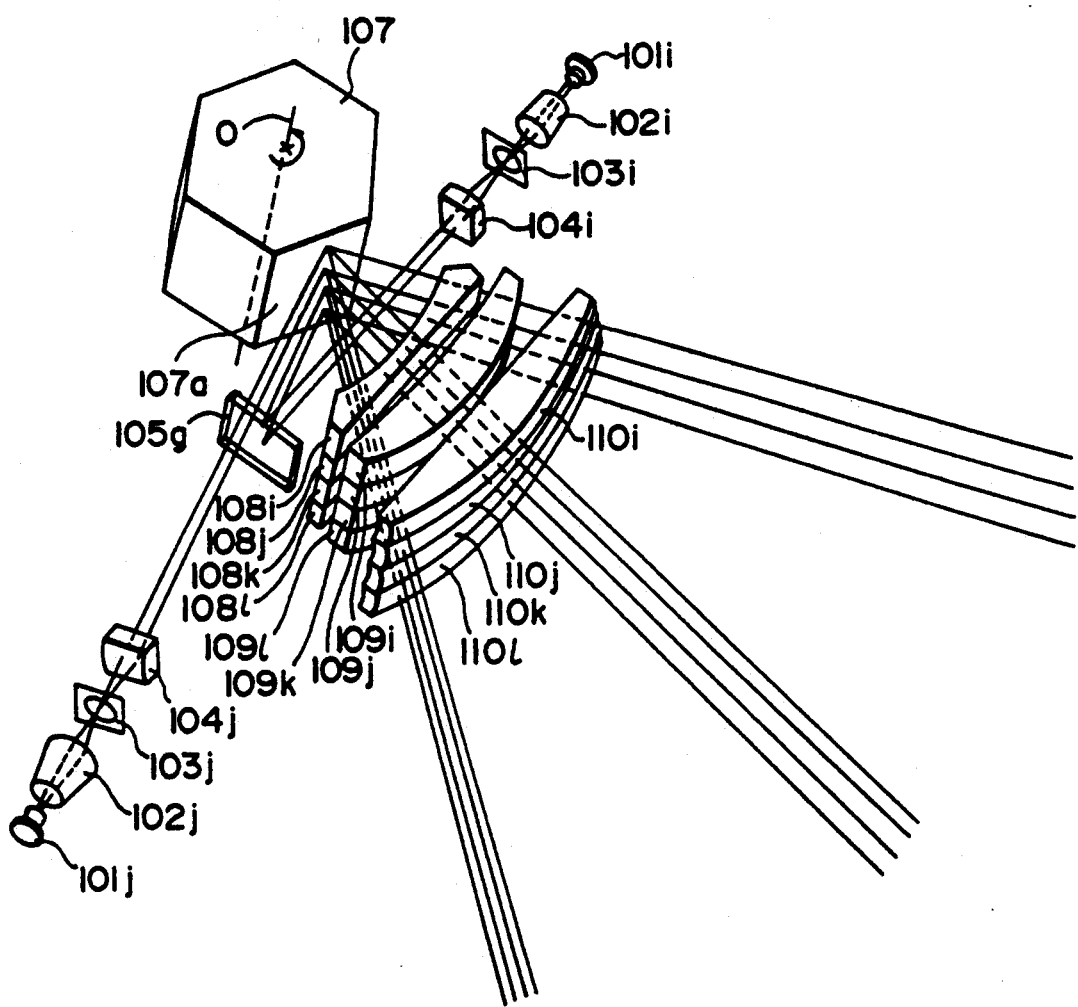

FIG. 10 is a perspective view of another embodiment of the optical scanning apparatus of the present invention, in which, in contrast to the embodiment shown in FIG. 9, two laser beams on each side of the scanning condenser lenses 108i-108l; 109i-109l; 110i-110l are emitted from a monolithic 2-beam laser unit 101i or 101j, guided through a collimating lens 102i or 102j and a diaphragm 103i or 103j common for two beams (the diaphragm 103a or 103j being positioned at the focal plane of the collimating lens 102i or 102j to constitute a telecentric system), and also a cylindrical lens 104i or 104j and enter a common reflective deflecting plane 107a. Two light beams from the monolithic 2-beam laser unit 101i pass between the rotary polygon mirror 107 and the scanner condenser lenses and are reflective by a common mirror 105g before entering the reflective plens 107a.

The optical principle of the present embodiment is basically same as that in the embodiments shown in FIGS. 8A, 8B and 9.

The present embodiment shown in FIG. 10 is featured by a further simplified structure, giving more room in the space close to the laser units 101i, 101j.

In the embodiments shown in FIGS. 8 to 10, the optical parameters are omitted because they are essentially similar to those of the embodiments shown in FIGS. 6 and 7.

As explained in the foregoing, the optical scanning apparatus of the present invention, for deflecting plural light beams from plural light sources by a single deflector and scanning respective planes with the light beams through scanning condenser lenses, is featured by a fact that at least one of the plural light beams guided to the deflector passes between the deflector and the condenser lenses. The at least one light beam passes between the deflector and scanning condenser lenses and reflected by a mirror, before entering the deflector. The deflector is composed of a rotary polygon mirror, and the light sources, condenser lenses and scanned planes are positioned symmetrically with respect to a plane containing the rotary axis of the polygon mirror and perpendicular to the optical axis or the condenser lenses.

Four light beams are guided to a single reflective deflecting plane of the deflector, and can be used for generating four images respectively of yellow, magenta, cyan and black, or red, green, blue and black, in an image forming apparatus generating a full-color image by multiple image transfers. In another embodiment, the light sources are composed of two monolithic 2-beam laser diodes each emitting two beams, whereby four light beams are guided to a reflective deflecting plane of the deflector, and two light beams from one of the laser diodes pass between the deflector and the scanning condenser lenses. The four light beams can be used for generating four images respectively of yellow, magenta, cyan and black, or red, green, blue and black, in an image forming apparatus generating a full-color image by multiple image transfers.

Also in another embodiment, on each side of a plane including the rotary axis and perpendicular to the optical axis of the scanning condenser lenses, two light beams are introduced into a reflective deflecting plane of the rotary polygon mirror and one of the two light beams is guided between the polygon mirror and the scanning condenser lenses. The four light beams can be utilized for forming four images respective of yellow, magenta, cyan and black, or red, green, blue and black, in an image forming apparatus for forming a full-color image by multiple image transfers.

Thus in the optical scanning apparatus of the present invention for deflecting plural light beams from laser units or the like by a single deflector such as a rotary polygon mirror or a galvanic mirror and scanning respective planes with the light beams through scanning condenser lenses, the light path of at least a light beam guided to the deflector is positioned between the deflector and the scanning condenser lenses.

As explained in the foregoing, the optical scanning apparatus of the present invention for scanning with plural light beams, the light sources and the optical systems can be positioned in well balanced manner on both sides of the scanning condenser lens, so that the space can be efficiently utilized and there can be obtained room around the light sources. Consequently the laser drivers or similar circuits requiring high response speed can be positioned close to the light sources. Also the optical scanning apparatus itself can be made simpler and more compact.

What is claimed is:

1. An optical scanning apparatus comprising:
plural light sources;
a deflector for deflecting plural light beams from said plural light sources; and
an optical system for focusing plural light beams deflected by said deflector, onto predetermined planes, said optical system having f-$\theta$ characteristics in a scanning direction and having plural optical axes in a sub scanning direction;
wherein said optical system is comprised of a first optical system and a second optical system, in which said first optical system has an afocal refractive power in the sub scanning direction, while said second optical system has plural axes respectively corresponding to said plural light beams, said second optical system focusing in the scanning direction and in the sub scanning direction.

2. An apparatus according to claim 1, wherein said optical system has, in the sub scanning direction, conjugate points on a reflective deflecting plane of said deflector and on said predetermined planes.

3. An apparatus according to claim 1, wherein said second optical system is an anamorphic optical system having different refractive power in the scanning direction and in the sub scanning direction.

4. An apparatus according to claim 3, wherein said second optical system has toric faces.

5. An apparatus according to claim 1, wherein the plural light beams deflected by said deflector enter said optical system with mutually parallel central rays and along a plane perpendicular to the scanning plane.

6. An apparatus according to claim 1, wherein said plural light beams focused onto said predetermined planes have different optical information, respectively.

7. An optical scanning apparatus comprising:
plural light sources;
a deflector for deflecting plural light beams from said plural light sources;
an optical system for focusing plural light beams deflected by said deflector, onto predetermined planes, said optical system having f-$\theta$ characteristics in the scanning direction and having plural optical axes in the sub scanning direction; and
guiding means for guiding some of said plural light beams form some of said plural light sources to said deflector after passing between said deflector and said optical system;
wherein said optical system is comprised of a first optical system and a second optical system, in which said first optical system has an afocal refractive power in the sub scanning direction, while said second optical system has plural axes respectively corresponding to said plural light beams.

8. An apparatus according to claim 7, wherein said plural light beams focused onto said predetermined planes have different optical information, respectively.

9. An image recording apparatus comprising:
plural light sources;
a deflector for deflecting plural light beams from said plural light sources;
an optical system for focusing the plural light beams deflected by said deflector, said optical system having f-$\theta$ characteristics in a scanning direction and having plural optical axes in a sub scanning direction; and
a photosensitive member on which said plural light beams deflected by said deflector are focused by said optical system;
wherein said optical system is comprised of a first optical system and a second optical system, in which said first optical system has an afocal refractive power in the sub scanning direction, while said second optical system has plural axes respectively corresponding to said plural light beams, said second optical system focusing in the scanning direction and in the sub scanning direction.

10. An apparatus according to claim 9, wherein images generated by focusing respective ones of said plural light beams on said photosensitive member are superposed to form a color image.

11. An optical scanning apparatus comprising:
means for generating plural light beams;
a deflector for deflecting plural light beams from said generating means; and
an optical system for focusing plural light beams deflected by said deflector onto predetermined planes, said optical system having f-$\theta$ characteristics in a scanning direction and comprising a first optical system and a second optical system, said first optical system having an afocal refractive power in a sub scanning direction, said second optical system having plural optical axes in the sub scanning direction, said second optical system focusing in the scanning direction and in the sub scanning direction.

12. An apparatus according to claim 11, wherein said plural light beams focused onto said predetermined planes have different optical information, respectively.

13. An optical scanning apparatus comprising:
   means for generating plural light beams;
   a deflector for deflecting plural light beams from said generating means;
   an optical system for focusing plural light beams deflected by said deflector onto predetermined planes; and
   means for guiding some of said plural light beams from said generating means to said deflector after passing between said deflector and said optical system.

14. An apparatus according to claim 13, wherein said plural light beams focused onto said predetermined planes have different optical information, respectively.

15. A laser beam printer apparatus comprising:
   plural light sources;
   a deflector for deflecting plural light beams from said plural light sources;
   an optical system for focusing plural light beams deflected by said deflector, onto predetermined planes, said optical system having f-$\theta$ characteristics in a scanning direction and having plural optical axes in a sub scanning direction, wherein said optical system is comprised of a first optical system and a second optical system, in which said first optical system has an afocal refractive power in the sub scanning direction, while said second optical system has plural axes respectively corresponding to said plural light beams, said second optical system focusing in the scanning direction and in the sub scanning direction;
   guiding means for guiding some of said plural light beams form some of said plural light sources to said deflector after passing between said deflector and said optical system; and
   a recording medium for receiving said plural light beams focused by said optical system.

16. An apparatus according to claim 15, wherein images generated by focusing respective ones of said plural light beams on said recording medium are superposed to form a color image.

17. A laser beam printer apparatus comprising:
   plural light sources for generating plural light beams;
   a deflector for deflecting plural light beams from said generating means;
   an optical system for focusing plural light beams deflected by said deflector, onto predetermined planes, said optical system having f-$\theta$ characteristics in a scanning direction and comprising a first optical system having an afocal refractive power in a sub scanning direction, said second optical system having plural optical axes in the sub scanning direction, said second optical system focusing in the scanning direction and in the sub scanning direction; and
   a recording medium for receiving said plural light beams deflected by said deflector and focused by said optical system.

18. An apparatus according to claim 17, wherein images generated by focusing respective ones of said plural light beams on said recording medium are superposed to form a color image.

19. A laser beam printer apparatus comprising:
   means for generating plural light beams;
   a deflector for deflecting plural light beams from said generating means;
   an optical system for focusing plural light beams deflected by said deflector onto predetermined planes;
   means for guiding some of said plural light beams from said generating means to said deflector after passing between said deflector and said optical system; and
   a recording medium for receiving said plural light beams focused by said optical system.

20. An apparatus according to claim 19, wherein images generated by focusing respective ones of said plural light beams on said recording medium are superposed to form a color image.

21. A scanning method in an optical scanning apparatus, comprising the steps of:
   deflectively scanning plural light beams; and
   guiding the deflectively scanned plural light beams to a predetermined plane by an optical system having f-$\theta$ characteristics with relation to the scanning direction and plural optical axes with relation to the sub-scanning direction;
   wherein said optical system is composed of a first optical system and a second optical system, in which the first optical system has an afocal refractive power in the sub-scanning direction, and the second optical system has plural optical axes, one for each of the plural light beams, and a focusing effect in the scanning and sub-scanning direction.

22. A method according to claim 21, wherein a predetermined plane is provided for each of said plural light beams.

23. A method according to claim 21, wherein said plural light beams have light information different from each other.

24. A method according to claim 21, further comprising the step of superposing images generated by guiding respective ones of the plural light beams to the predetermined plane.

25. A recording method in a laser beam print apparatus, comprising the steps of:
   deflectively scanning plural light beams; and
   guiding the deflectively scanned plural light beams to a predetermined plane by an optical system having f-$\theta$ characteristics with relation to the scanning direction and plural optical axes with relation to the sub-scanning direction;
   wherein said optical system is composed of a first optical system and a second optical system, in which the first optical system has an afocal refractive power in the sub-scanning direction and in which the second optical system has plural optical axes, one for each of the plural light beams, and a focusing effect in the scanning and sub-scanning directions.

26. A method according to claim 25, wherein a predetermined plane on the recording medium is provided for each of said plural light beams.

27. A method according to claim 25, wherein said plural light beams have light information different from each other.

28. A method according to claim 25, further comprising the step of superposing images generated by guiding respective ones of the plural light beams to the recording medium, thereby forming a color image.

* * * * *

UNITED STATES PATENT AND TRADEMARK OFFICE
CERTIFICATE OF CORRECTION

PATENT NO. : 5,251,055
DATED : October 5, 1993
INVENTOR(S) : JUN KOIDE

It is certified that error appears in the above-identified patent and that said Letters Patent is hereby corrected as shown below:

COLUMN 1

Line 11, "beam," should read --beam printer,--;
    Line 30, "beam." should read --beams.--; and
    Line 33, "and" should be deleted.

COLUMN 2

Line 38, "the" should read --of the--.

COLUMN 3

Line 10, "difference" should read --different--.

COLUMN 6

Line 8, "has" should read --have--

COLUMN 8

Line 66, "compacter" should read --more compact--.

COLUMN 9

Line 25, "1081," should read --108a,--;
    Line 42, "113c," should read --112c,--;
    Line 57, "wall" should read --well--; and
    Line 65, "102c-102h;" should read --102e-102h;--.

COLUMN 10

Line 2, "103g," should read --104g,--;
    Line 9, "mirror" should read --mirrors--;
    Line 32, "103a" should read --103i--;
    Line 38, "reflective" should read --reflected--;
    Line 40, "plens" should read --plane--;
    Line 59, "and" should read --and is--; and
    Line 65, "or" should read --of--.

UNITED STATES PATENT AND TRADEMARK OFFICE
CERTIFICATE OF CORRECTION

PATENT NO. : 5,251,055
DATED : October 5, 1993
INVENTOR(S) : JUN KOIDE

It is certified that error appears in the above-identified patent and that said Letters Patent is hereby corrected as shown below:

COLUMN 11
    Line 22, "respective" should read --respectively--; and
    Line 50, "beams" should read --beams,--.

COLUMN 12
    Line 16, "beams" should read --beams,--; and
    Line 22, "form" should read --from--.

COLUMN 13
    Line 53, "deflector," should read --deflector--.

COLUMN 14
    Line 47, "predetermined plane" should read --recording medium--.

Signed and Sealed this

Twenty-fourth Day of May, 1994

Attest:

BRUCE LEHMAN

*Attesting Officer*     *Commissioner of Patents and Trademarks*